Aug. 24, 1954  W. A. GUBELIN  2,686,944
SCENT PROJECTING APPARATUS
Filed July 7, 1950  3 Sheets-Sheet 1
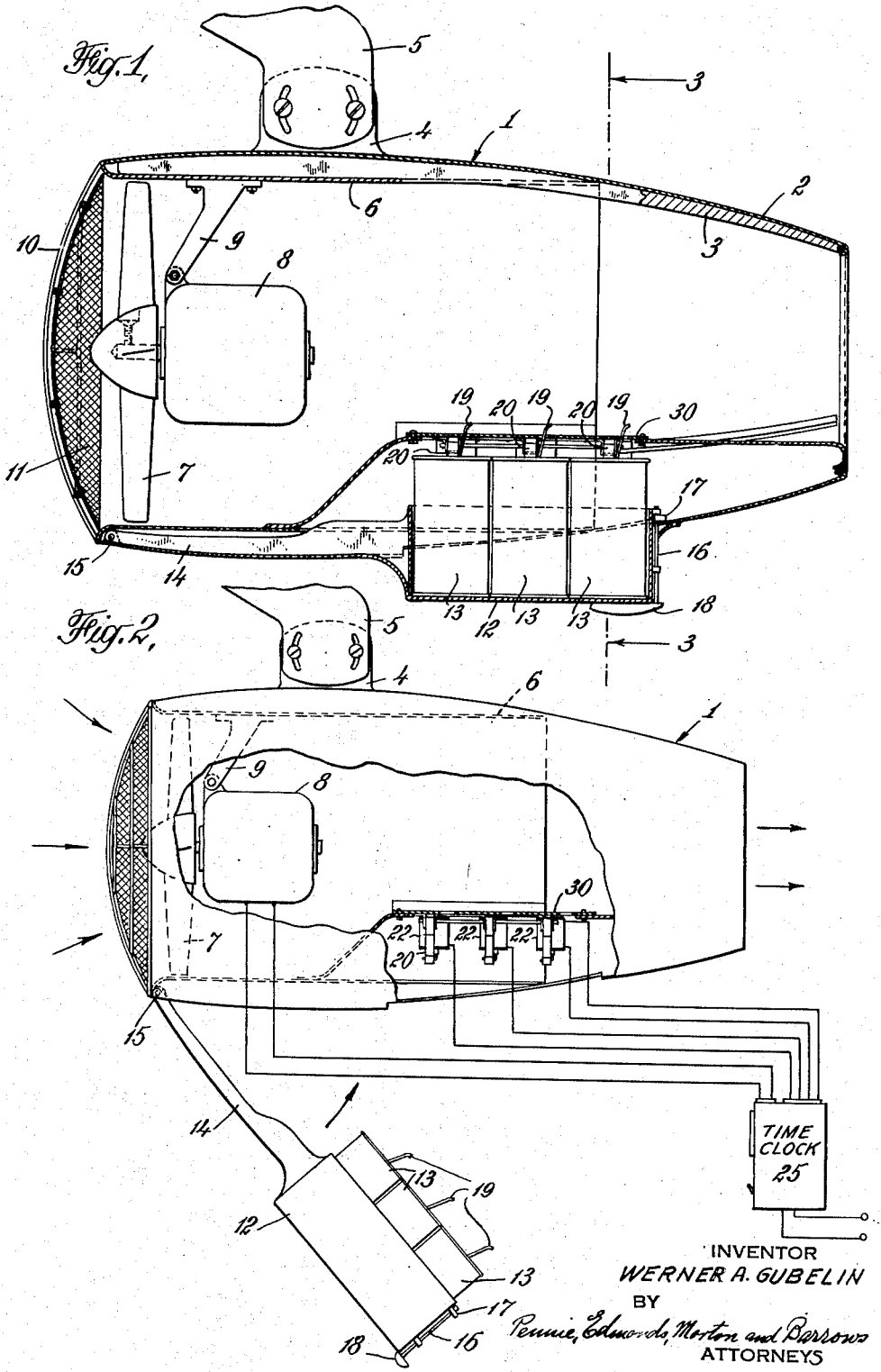
INVENTOR
WERNER A. GUBELIN
BY
Pennie, Edmonds, Morton and Barrows
ATTORNEYS

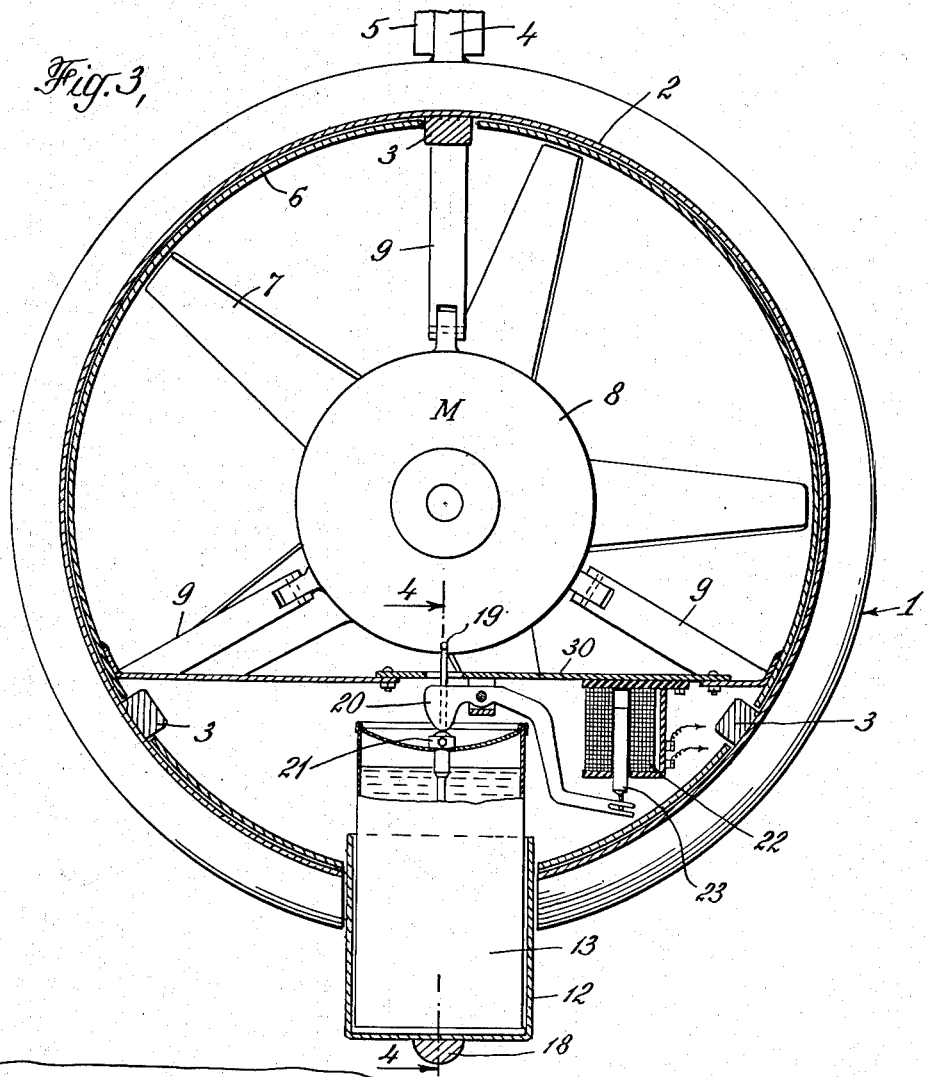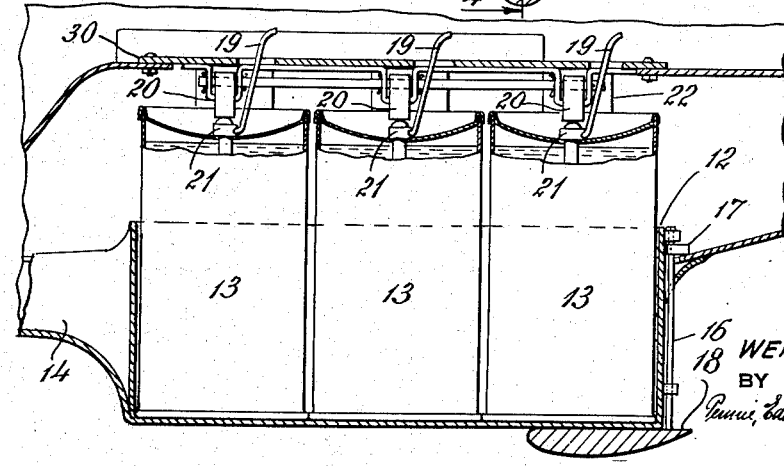

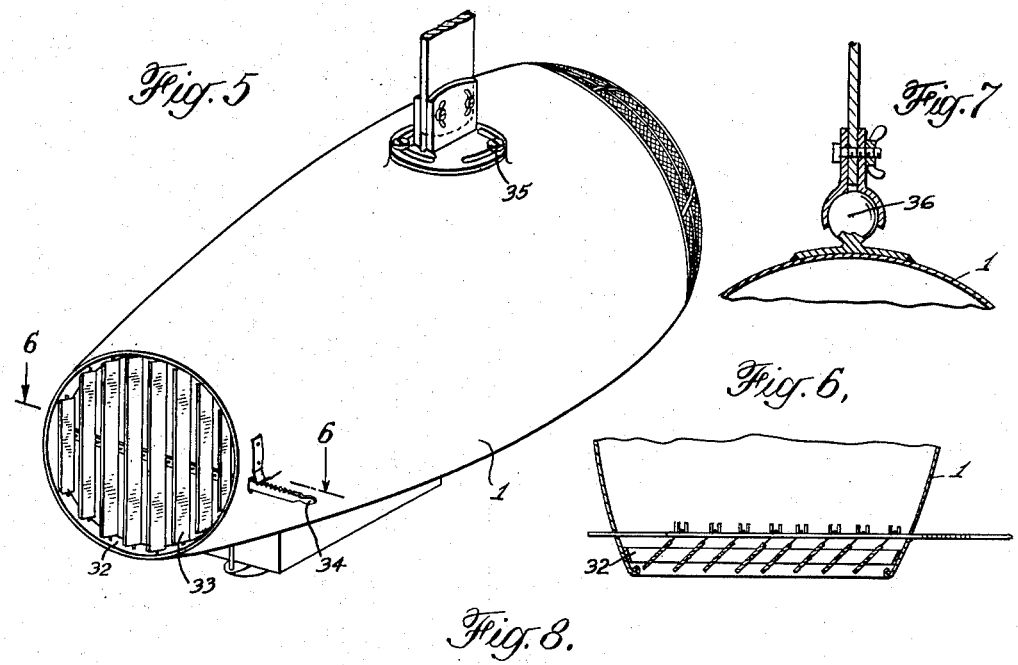
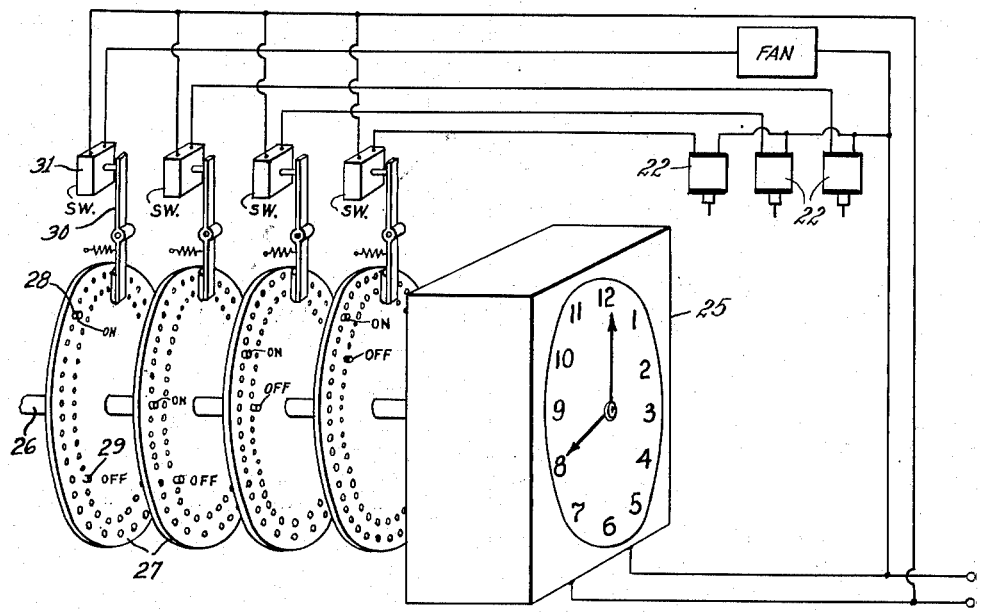

UNITED STATES PATENT OFFICE 2,686,944

SCENT PROJECTING APPARATUS

Werner A. Gubelin, Pleasantville, N. Y.

Application July 7, 1950, Serial No. 172,497

1 Claim. (Cl. 21—126)

This invention relates to apparatus for distributing perfume or other vapors throughout the atmosphere either indoors or outdoors, and has for its object to provide an apparatus of this character which is entirely automatic in operation and wherein the time and duration of the scent distributed may be automatically varied at will.

A further object of the invention is to provide an apparatus which may be supported in an entirely concealed position where its presence cannot be detected and which will disseminate a scent about the premises of a character to promote the business carried on therein. For example the apparatus can be arranged to discharge air carrying the scent of flowers then in season over the sidewalk in front of a florist shop to thereby bring to notice of the passerby the nature of the wares sold in the shop. Such an installation greatly enhances the value of attractive window displays.

A further object of the invention is to provide an apparatus of this character wherein several different perfumes or other volatile liquids may be distributed either simultaneously or in any desired sequence.

A further object of the invention is to provide in an apparatus of this character, means for automatically operating the release valves of cans containing volatile liquids such as are now available on the market for many purposes, so that a single apparatus may be used for regulating the distribution of perfumes, deodorants, insecticides and any other type of commodity which may be marketed in a container of this kind.

A further object of the invention is to provide an apparatus of the class described wherein the stream of scent-laden air may be directed in any desired direction.

A further object of the invention is to provide an apparatus of the class described which is of simple construction and neat appearance, and which requires no special installation other than connection to the usual commercial power circuit.

In the accompanying drawings I have illustrated a preferred embodiment of my invention, and in the said drawings, Fig. 1 shows my improved scent distributor in longitudinal section;

Fig. 2 is a side elevation, partly broken away, of the apparatus shown in Fig. 1;

Fig. 3 is a horizontal section on line 3—3 of Fig. 1 but on an enlarged scale;

Fig. 4 is a longitudinal section on line 4—4 of Fig. 3;

Fig. 5 is a perspective view of a modified form of casing;

Fig. 6 is a sectional view on line 6—6 of Fig. 5;

Fig. 7 is a detail view of a further modification; and

Fig. 8 is a schematic view showing a typical automatic control arrangement.

Referring to the drawings, 1 indicates the casing of the apparatus which may be of any suitable configuration, for example, the torpedo contour illustrated herein. The casing consists of a sheet metal shell 2 having three longitudinal ribs 3 to the top of which is attached a lug 4 for for connection to the supporting bracket 5. The shell 2 is open at both ends and fitted within the shell from the larger rear end is an inner casing 6 in which is mounted a fan 7 whose motor 8 is supported centrally of the casing 6 by means of brackets 9 positioned to coincide with the position of the ribs 3. The casing 6 is provided with slots in its walls corresponding to the ribs 3 to thereby position the inner shell within the outer casing. By this construction the motor and fan may be readily removed for cleaning or repair without disturbing the outer casing or removing it from its bracket. The larger end of the inner casing is closed by means of a screen 10 holding a removable filter 11 whereby the air circulated by the fan will be filtered, thus continuously removing dust particles and the like from the air, so that the air is improved by the re-circulation without the addition of outside air.

The casings 2 and 6 are cut away along the bottom as indicated in Fig. 13 to receive the upper portion of a swinging carrier 12 in which are the cans 13 containing the volatile liquid under pressure to be added to the air circulated by the fan. The carrier 12 consists of an oblong sheet metal box attached to the front end of a lever 14 which is hinged at its rear end as indicated at 15 to ears struck up from the sheet metal of the casing 2. The shape and size of the container 12 and lever 14 are such that the lower portion of the container 12 projects below the bottom wall of the casing 2 so as to present an outward appearance simulating that of a dirigible with the usual suspended car or compartment.

The container 12 is supported in closed position by means of a locking device consisting of a vertical rod 16 hinged on the front end of the can container and having a latch 17 adapted to extend over the adjacent portion of the shell 2 when the handle 18 of the locking device is turned to locking position as indicated.

Each can 13 is provided with an extended nozzle tube 19 which is designed to fit over the discharge pipe of the commercial cans, the nozzle tubes 19 projecting upwardly through holes in the bottom of the inner casing 6 when the can container 12 is locked in closed position as above described. A partition 30 extends across the front end of the casing 6 overlying the tops of the cans 13, and levers 20 are pivoted to the underside of the partition 30 in position to contact the exposed ends of the valves 21 of the cans 13. The valves 21 are so constructed that pressure on the exposed ends at the points contacted by the levers 20 opens the valve and permits the discharge of a fine spray of the volatile contents of the cans. For operating the levers 20 to open the valves I provide for each lever a solenoid 22 also suspended from the partition 30, the core 23 of each solenoid being connected by a pin and slot connection with the end of the lever 20 opposite the end which contacts the valve 21, whereby upward movement of the core of the solenoid will cause the opposite end of the lever 20 to press against the valve 21 and open the valve.

The motor of the fan and the several solenoids may be energized in any desired manner. I preferably provide a timing clock 25 which may be of any suitable construction, and which serves to close one or more circuits, as desired, at predetermined times and for predetermined periods.

In Fig. 8 I have illustrated a common type of time clock which may be used for controlling the operation of the device. As here shown the shaft 26 is driven by the clock at a speed of one revolution per twenty-four hours. Attached to the shaft 26 are four disks 27, one for each solenoid and one for the fan. The disks are provided with two series of holes for receiving pegs 28 and 29 which serve to trip the switches 30 through which the solenoids 22 and the fan motor are energized. The positions of the pegs 28 and 29 determine the time and duration of fan operation and the time and period that each valve 21 is open. Any number of pegs may be provided to secure opening of the valves at frequent intervals.

In Fig. 5 I have shown a modified form of casing to facilitate directing the air stream in any desired path. The bracket to which the arm 5 is attached is connected to the casing by a slot and screw connection so that the casing may be turned in any direction within the limits permitted by the slots. In addition I provide at the front of the casing a series of vertical louvres 33 pivoted in a ring 32 attached to the open end of the casing and provided with an operating bar 34 by means of which the louvres may be variously positioned.

Instead of the construction shown in Figs. 5 and 6 I may support the casing by means of a ball joint as shown at 36 in Fig. 7 to provide a universal adjustment for the fan casing. I may also, if desired, mount the casing for oscillating movement and provide a connection with the fan motor for oscillating the casing in the same manner as oscillating fans.

I have not described any particular sequence of operations for the circuits controlled by the time clock, as the same may be widely varied to meet different conditions. For instance, in a store installation the fan may be set to run continuously during store hours and one or more of the solenoids set to periodically discharge into the air a vapor of perfume to offset the odors incidental to occupancy by a number of people and also, in some cases, by the nature of the goods being sold. Also, the fan may be set to run for a period during the night and one of the solenoids set to release a sterilizing vapor or deodorant to purify the air. My invention is not limited to any particular sequence of operations but covers the apparatus disclosed whereby any desired sequence of operations may be provided.

It is also to be understood that my invention is not limited to the details of the apparatus disclosed except insofar as recited in the appended claim.

I claim:

A scent distributing apparatus comprising a housing, a fan at one end of the housing positioned to move air through said housing, a movable support on the under side of said housing for a plurality of receptacles containing scented vapors under pressure and discharge spouts positioned to discharge said vapors into said housing into the stream of air moved by said fan and valves for said discharge spouts and mechanism for controlling the opening and closing of said valves, said mechanism including cams mounted on said housing adjacent said support and in position to engage said valves when said housing is in closed position with said spouts discharging into the air stream.

References Cited in the file of this patent

UNITED STATES PATENTS

| Number | Name | Date |
|---|---|---|
| 2,047,844 | Wehner | July 14, 1936 |
| 2,179,166 | Stricklen et al. | Nov. 7, 1939 |
| 2,181,422 | Gawan | Nov. 28, 1939 |
| 2,249,442 | Thornberry | July 15, 1941 |
| 2,277,552 | Kneedler | Mar. 24, 1942 |
| 2,529,605 | Gustafson | Nov. 14, 1950 |
| 2,562,959 | Stern | Aug. 7, 1951 |
| 2,562,960 | Stern | Aug. 7, 1951 |